United States Patent
Jung et al.

(10) Patent No.: US 11,134,179 B2
(45) Date of Patent: Sep. 28, 2021

(54) IMAGE SENSOR AND ELECTRONIC DEVICE INCLUDING THE IMAGE SENSOR

(71) Applicant: Samsung Electronics Co., Ltd., Suwon-si (KR)

(72) Inventors: Hwajoong Jung, Suwon-si (KR); Manho Kim, Suwon-si (KR); Changhoon Kim, Suwon-si (KR); Yonghwan Choi, Suwon-si (KR); Kihuk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/923,653

(22) Filed: Jul. 8, 2020

(65) Prior Publication Data
US 2021/0014387 A1     Jan. 14, 2021

(30) Foreign Application Priority Data
Jul. 12, 2019   (KR) .......................... 10-2019-0084569

(51) Int. Cl.
*H04N 5/10*     (2006.01)
*H04N 5/05*     (2006.01)
(Continued)

(52) U.S. Cl.
CPC ................. *H04N 5/10* (2013.01); *H04N 5/05* (2013.01); *H04N 5/0675* (2013.01); *H04N 5/23227* (2018.08)

(58) Field of Classification Search
CPC ........ H04N 5/04; H04N 5/23227; H04N 5/10; H04N 5/05; H04N 5/0675; H04N 5/265; H04N 5/268; H04N 5/262
(Continued)

(56) References Cited

U.S. PATENT DOCUMENTS

2005/0270368 A1   12/2005   Hashimoto
2006/0082663 A1*  4/2006    Rooy ..................... H04N 5/272
                                                       348/231.99
(Continued)

FOREIGN PATENT DOCUMENTS

JP   2008-502206 A   1/2008
KR   1992-0008608 U  5/1992
(Continued)

OTHER PUBLICATIONS

International Search Report dated Oct. 26, 2020, Issued in International Application No. PCT/KR2020/009081.

*Primary Examiner* — Sherrie Hsia
(74) *Attorney, Agent, or Firm* — Jefferson IP Law, LLP

(57) ABSTRACT

An electronic device is provided. The electronic device includes a first image sensor, a second image sensor electrically connected to the first image sensor, and a processor operatively connected to the first image sensor and the second image sensor. The processor may be configured to generate first image data using the first image sensor and generate second image data using the second image sensor based on a synchronizing signal, transmit the second image data generated by the second image sensor to the first image sensor, and control the first image sensor to generate and output image data by processing the first image data and the second image data based on the synchronizing signal.

20 Claims, 14 Drawing Sheets

(51) Int. Cl.
*H04N 5/232* (2006.01)
*H04N 5/067* (2006.01)

(58) Field of Classification Search
USPC ....... 348/500, 525, 526, 536, 584, 598, 705, 348/706
See application file for complete search history.

(56) References Cited

U.S. PATENT DOCUMENTS

| | | | |
|---|---|---|---|
| 2009/0278951 A1* | 11/2009 | Loose | H04N 5/04 348/222.1 |
| 2011/0109726 A1 | 5/2011 | Hwang et al. | |
| 2011/0274368 A1 | 11/2011 | Kondo et al. | |
| 2012/0075412 A1 | 3/2012 | Miyamoto et al. | |
| 2013/0021447 A1 | 1/2013 | Brisedoux et al. | |
| 2015/0271483 A1 | 9/2015 | Sun et al. | |

FOREIGN PATENT DOCUMENTS

| | | |
|---|---|---|
| KR | 10-2011-0050843 A | 5/2011 |
| KR | 10-2017-0132495 A | 12/2017 |

\* cited by examiner

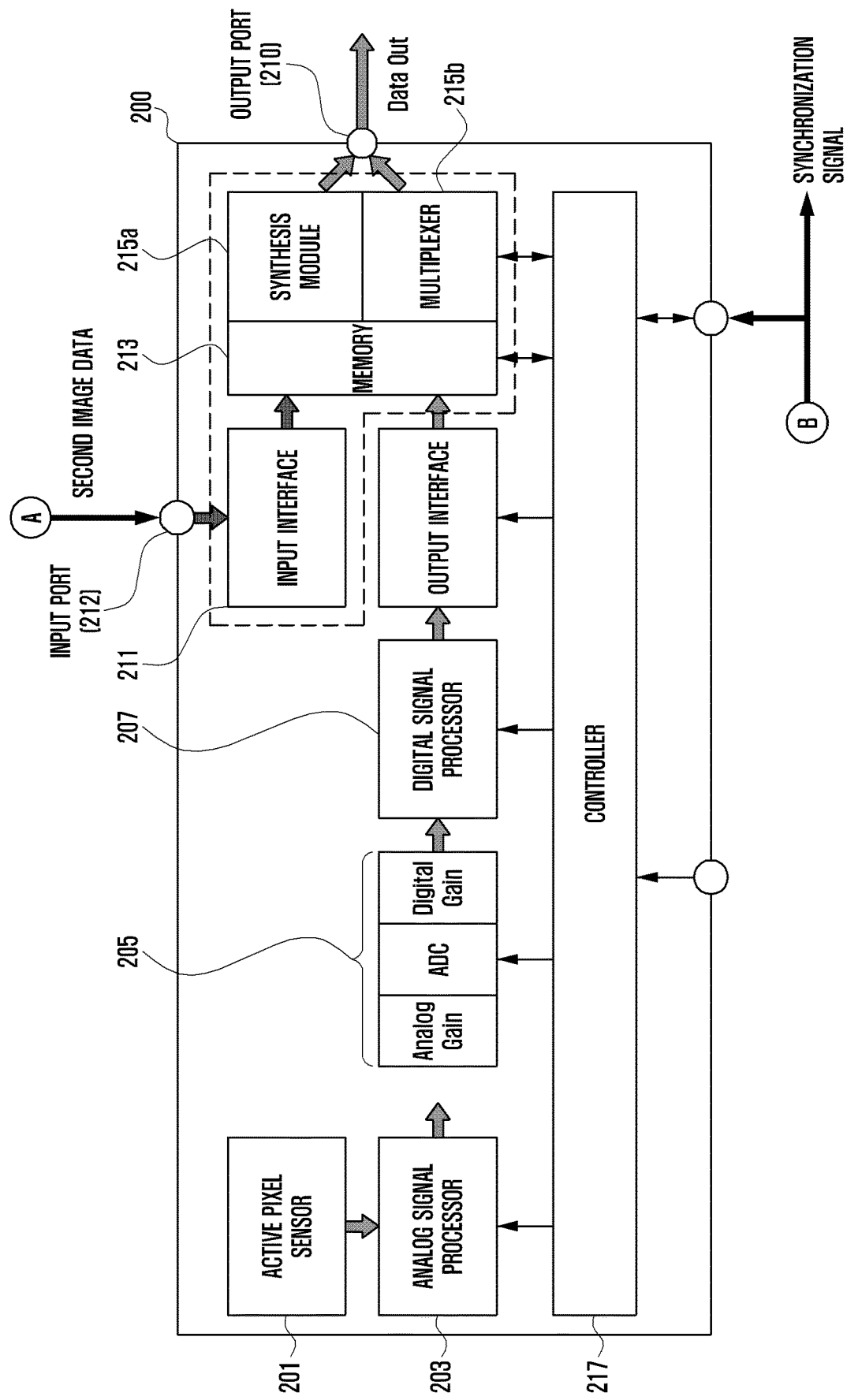

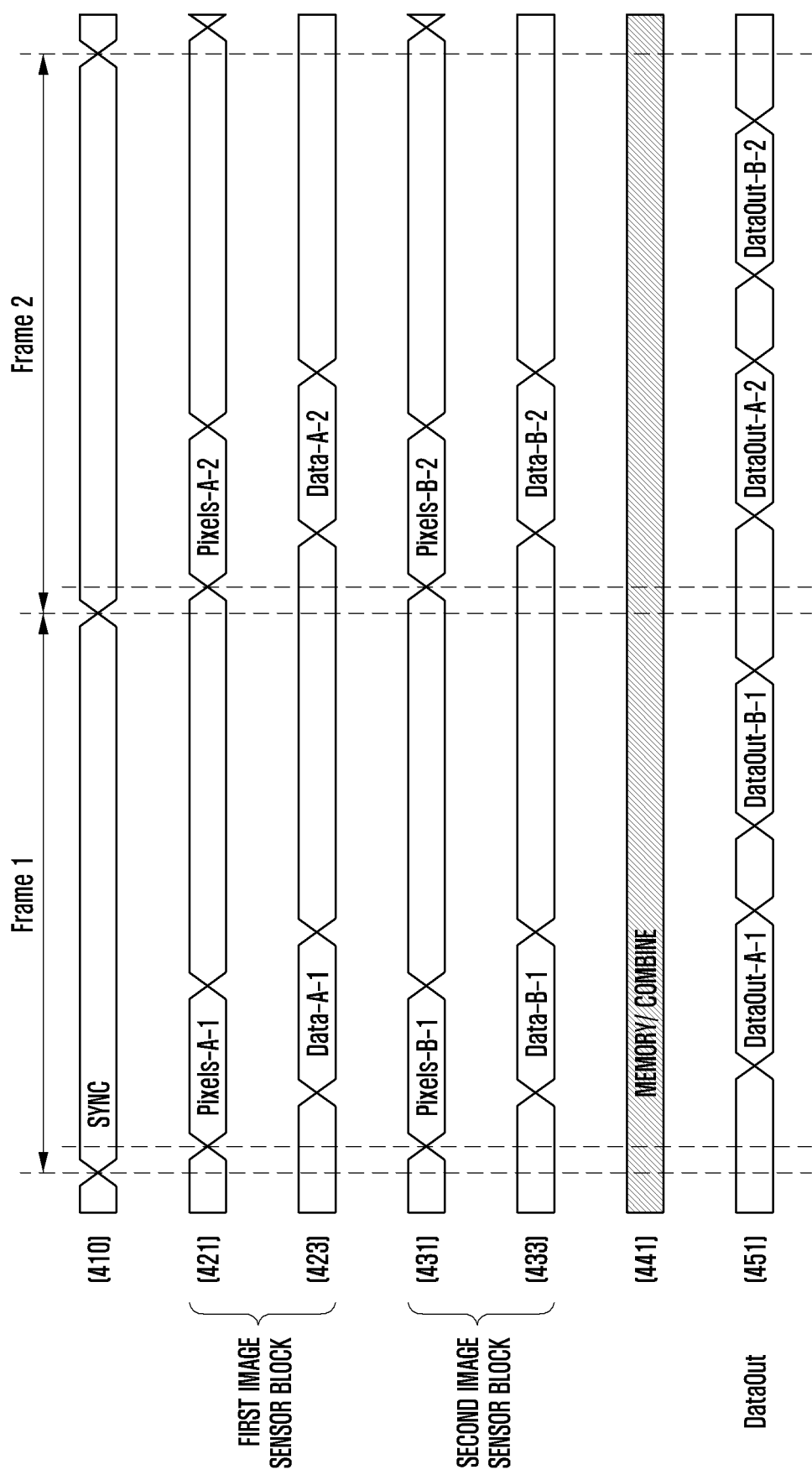

IMAGE SENSOR AND ELECTRONIC DEVICE INCLUDING THE IMAGE SENSOR

CROSS-REFERENCE TO RELATED APPLICATION(S)

This application is based on and claims priority under 35 U.S.C. § 119(a) of a Korean patent application number 10-2019-0084569, filed on Jul. 12, 2019, in the Korean Intellectual Property Office, the disclosure of which is incorporated by reference herein in its entirety.

BACKGROUND

1. Field

The disclosure relates to an image sensor and an electronic device including the image sensor.

2. Description of Related Art

Recently, with the development of technology, electronic devices supporting various user functions, such as a smart phone and a tablet personal computer (PC), have been released. Such electronic devices may include cameras, and thus they can provide various functions related to the cameras to users. Electronic devices including two or more image sensors have recently been released.

The above information is presented as background information only to assist with an understanding of the disclosure. No determination has been made, and no assertion is made, as to whether any of the above might be applicable as prior art with regard to the disclosure.

SUMMARY

In the case of an electronic device including a plurality of image sensors, because output wirings for image data output are designed with respect to the plurality of image sensors, the size of a printed circuit board (PCB) may be enlarged, and the number of connector pins may be increased to the point of encountering a structural limitation.

If the image sensor is provided with only an output port for outputting the generated image data, it is not possible to receive and synthesize image data generated by an external image sensor, and thus the plurality of image sensors are designed to have respective output wirings for image data synthesis. Accordingly, the size of the PCB may be enlarged, and the number of connector pins may be increased, resulting in reaching the structural limitation.

Aspects of the disclosure are to address at least the above-mentioned problems and/or disadvantages and to provide at least the advantages described below. Accordingly, an aspect of the disclosure is to provide an image sensor and an electronic device including the image sensor.

Additional aspects will be set forth in part in the description which follows and, in part, will be apparent from the description, or may be learned by practice of the presented embodiments.

In accordance with an aspect of the disclosure, an electronic device is provided. The electronic device includes a first image sensor, a second image sensor electrically connected to the first image sensor, and a processor operatively connected to the first image sensor and the second image sensor. The processor is configured to generate first image data using the first image sensor, generate second image data using the second image sensor based on a synchronizing signal, transmit the second image data to the first image sensor, and control the first image sensor to generate output image data and output the output image data by processing the first image data and the second image data based on the synchronizing signal.

In accordance with another aspect of the disclosure, an image sensor is provided. The image sensor includes a pixel sensor, an input port, an output port, a memory, a synthesis module, a multiplexer, and a controller. The controller is configured to control to generate first image data using a signal sensed through the pixel sensor, store the first image data in the memory, receive second image data from an external image sensor through the input port, store the second image data in the memory, and control one of the synthesis module or the multiplexer to generate output image data and output the output image data by processing the first image data and the second image data based on a received synchronizing signal.

According to the electronic device according to various embodiments of the disclosure, because the output wirings for the image data output of the plurality of image sensors are designed in one stage, both the size of the PCB and the number of connector pins can be reduced, and thus the structural limitation can be avoided.

According to the image sensor according to various embodiments of the disclosure, because the input port is included in the image sensor, it is possible to receive the image data generated by the external image sensor, and thus it is possible to output one piece of image data by synthesizing the image data generated by the image sensor and the image data received from the external image sensor. Accordingly, the output wirings for the image data output can be designed in one stage, and thus the structural limitation can be avoided.

Other aspects, advantages, and salient features of the disclosure will become apparent to those skilled in the art from the following detailed description, which taken in conjunction with the annexed drawings, discloses various embodiments of the disclosure.

BRIEF DESCRIPTION OF THE DRAWINGS

The above and other aspects, features and advantages of certain embodiments of the disclosure will be more apparent from the following description, taken in conjunction with the accompanying drawings, in which:

FIG. 3B is a diagram simply illustrating a process in which a plurality of mage sensors process image data according to an embodiment of the disclosure;

FIG. 4A is a diagram illustrating a method in which an image sensor synthesizes or selects image data according to an embodiment of the disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
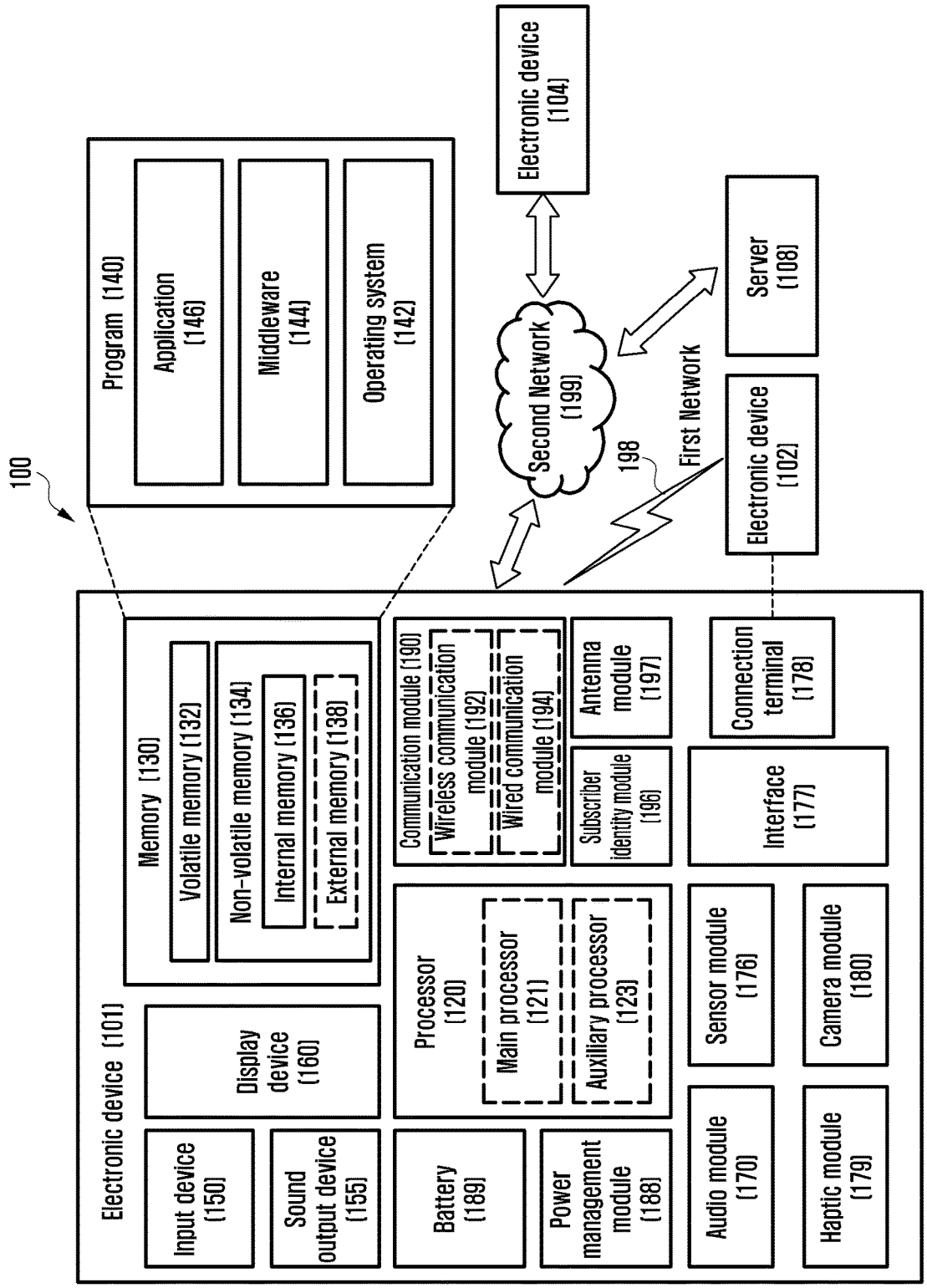
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
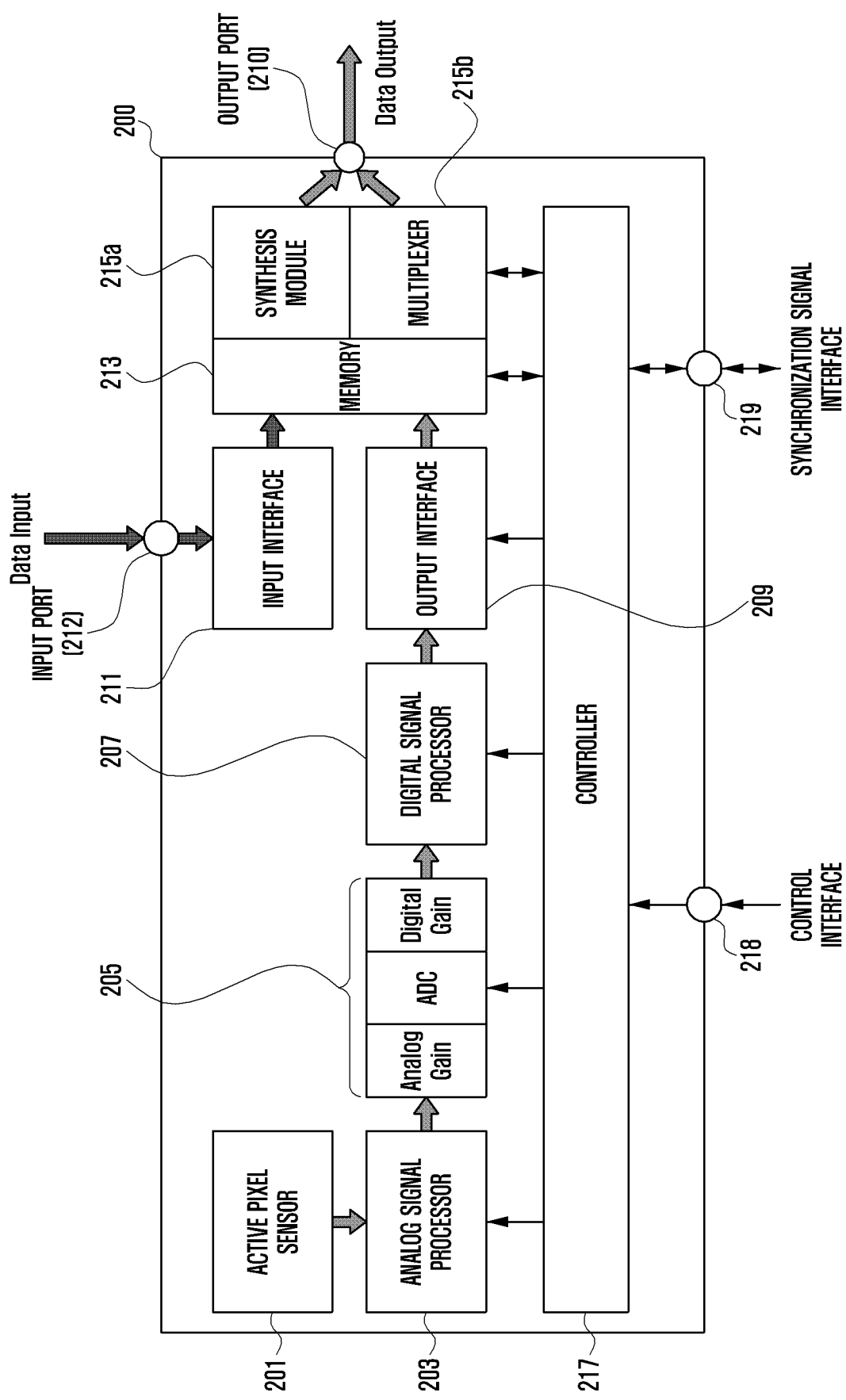
FIG. 2 is a block diagram of an image sensor according to an embodiment of the disclosure.

FIG. 2 is a block diagram of an image sensor according to an embodiment of the disclosure. According to various embodiments, a first image sensor 200 may be a constituent element of a camera (e.g., camera module 180 of FIG. 1) provided in an electronic device 101. For example, the first image sensor 200 may receive a power from a power management module (e.g., power management module (e.g., power management module 188 of FIG. 1), and it may generate image data. The first image sensor 200 may transmit the generated image data to other constituent elements (e.g., processor 120 and memory 130) of the electronic device 101.

Referring to FIG. 2, the first image sensor 200 according to various embodiments of the disclosure may include a first active pixel sensor (APS) 201, an analog signal processor 203, an analog-to-digital converter (ADC) 205, a digital signal processor 207, an output interface 209, an output port 210, an input interface 211, an input port 212, a memory 213, a synthesis module 215a, a multiplexer (MUX) 215b, a controller 217, a control interface 218, or a synchronizing signal interface 219. Even if a part of the configuration illustrated in FIG. 2 is omitted or replaced, there may be no difficult in implementing various embodiments disclosed in this document.

The first active pixel sensor 201 according to various embodiments may be a pixel sensor that generates image data through transformation of light received through a lens of the camera into an electrical signal. The first active pixel sensor 201 may amplify, for example, current generated due to the photoelectric effect of a light receiving element. The first active pixel sensor 201 may include, for example, a plurality of pixels P (i, j) arranged in 2D (here, i and j indicate the location of pixels, and i may be a row number and j may be a column number). For example, each of at least parts of the pixels may include a photoelectric transformation element (or position sensitive detector (PDS) and a plurality of transistors (e.g., reset transistor, transfer transistor, select transistor, and driver transistor). Further, the first active pixel sensor 201 may include a plurality of column lines. Each of the column lines may be electrically connected to pixels arranged in a column direction. The first active pixel sensor 201 may be a complementary metal-oxide-semiconductor (CMOS) sensor produced by CMOS technology.

The analog signal processor 203 according to various embodiments may be configured to process an analog electrical signal received from the first active pixel sensor 201. The ADC 205 according to various embodiments may be configured to convert an analog signal into a digital signal. For example, the ADC 205 may be configured to convert an electrical signal received from the analog signal processor 203 into pixel data. The ADC 205 may further include, for example, an analog gain for amplifying an analog signal and a digital gain for amplifying a digital signal. The digital signal processor 207 according to various embodiments may be configured to process the digital signal.

The output interface 209 according to various embodiments may output image data received from the digital signal processor 207 to another constituent element (e.g., processor 120 of FIG. 1) of the electronic device 101 through the output port 210. The output interface 209 according to various embodiments may temporarily store the image data received from the digital signal processor 207 in the memory 213.

The input interface 211 according to various embodiments may receive the image data output from an external image sensor (not shown) through the input port 212. The input interface 211 according to various embodiments may temporarily store the image data received from the external image sensor in the memory 213.

The memory 213 according to various embodiments may store various kinds of data. The data may include, for example, image data generated by the first image sensor 200 and image data generated by the external image sensor. The memory 213 may be, for example, a buffer.

The synthesis module 215a according to various embodiments may generate one piece of image data by synthesizing plural pieces of image data stored in the memory 213 under the control of the controller 217. For example, the synthesis module 215a may generate one piece of output image data by synthesizing first image data stored through the output interface 209 and second image data stored through the input interface 211 based on a predetermined scheme. According to various embodiments, the synthesis module 215a may generate the output image data by performing cross-synthesis of the first image data and the second image data in the unit of a frame, in the unit of a pixel, or in the unit of a line, based on a synchronizing signal. The line may mean a set of pixels in one row (or column). For example, a plurality of pieces of pixel data may be gathered to form one piece of line data, and a plurality of pieces of line data may be gathered to form one piece of image data. The synchronizing signal may be a signal for controlling the plurality of image sensors to capture images at the same time zone. For example, the synchronizing signal may be a control signal for a reference so that the synthesis module can synthesize plural pieces of image data captured at the same time zone when synthesizing the plurality of image data generated by the plurality of image sensors. The synchronizing signal may be received, for example, from an application processor (AP) of the electronic device or an external image sensor. The preconfigured schemes may include various schemes for synthesizing and selecting a plurality of pieces of image data, and the synthesis or selection schemes may be configured by users or may be configured by default values of the first image sensor 200. The method for synthesizing or selecting the image data based on the preconfigured schemes may be performed by the synchronizing signal transferred from the processor 120 of the electronic device 101.

The synthesis module 215a according to various embodiments may discriminate common data and difference data by comparatively analyzing the first image data and the second image data, and it may generate one piece of output image data by synthesizing the common data of the first image data and the second image data. According to various embodiments, the synthesis module 215a may discriminate the common data and the difference data of the first image data and the second image data from each other based on at least one of data similarity, color, or contrast (or degree of blurring).

According to various embodiments, if the number of pixels of the first image sensor 200 is different from the number of pixels of the external image sensor, the size of the first image data generated by the first image sensor 200 may be different from the size of the second image data generated by the external image sensor. If the first image data and the second image data have different sizes, the synthesis module 215a may generate output image data by performing cross-synthesis of the first image data and the second image data in the unit of a frame. According to various embodiments, if the first image data and the second image data have different sizes, the image sensor may add padding data to the image data having a smaller size and it may synthesize the corresponding image data added with the padding data, or the image sensor may divide and synthesize the image data having a larger size.

The multiplexer 215b according to various embodiments may select one of the plural pieces of image data stored in the memory 213 based on the preconfigured scheme, and it may output the selected image data through the output port 210. For example, between the first image data generated by the first image sensor 200 and the second image data generated by the external image sensor, the multiplexer 215b may select and output the first image data or it may select and output the second image data. For example, the multiplexer 215b may generate the output image data by selecting one of the first image data and the second image data in the unit of a frame, and it may output the generated output image data.

The first image sensor 200 according to various embodiments may include at least one of the synthesis module 215a or the multiplexer 215b.

The controller 217 according to various embodiments may be configured to perform control of respective constituent elements of the first image sensor 200 and/or communication-related operation or data process, and thus it may be operatively connected to the respective constituent elements of the first image sensor 200. The control interface 218 according to various embodiments may be an interface that transmits a control command of the processor 120 of the electronic device 101 to the controller 217.

The synchronizing signal interface 219 according to various embodiments may be an interface that transmits the synchronizing signal transmitted by the processor 120 to the controller 217. For example, the first image sensor 200 may receive the synchronizing signal that is transmitted from the application processor (AP) (e.g., processor 120 of FIG. 1) or the external image sensor through the synchronizing signal interface 219.

Because the first image sensor 200 according to various embodiments of the disclosure includes the input port 212, the memory 213, the synthesis module 215a, or the multiplexer 215b, the first image sensor 200 may receive the second image data generated and outputted from the external image sensor, and it may synthesize the first image data generated by the first image sensor 200 and the second image data outputted from the external image sensor to output one piece of image data. Although the electronic device 101 according to various embodiments of the disclosure includes a plurality of image sensors 200, the electronic device 101 can connect only one first image sensor 200 to a connector to output the image data, and thus the size of the PCB and the number of connector pins can be reduced.

Figure 3A:
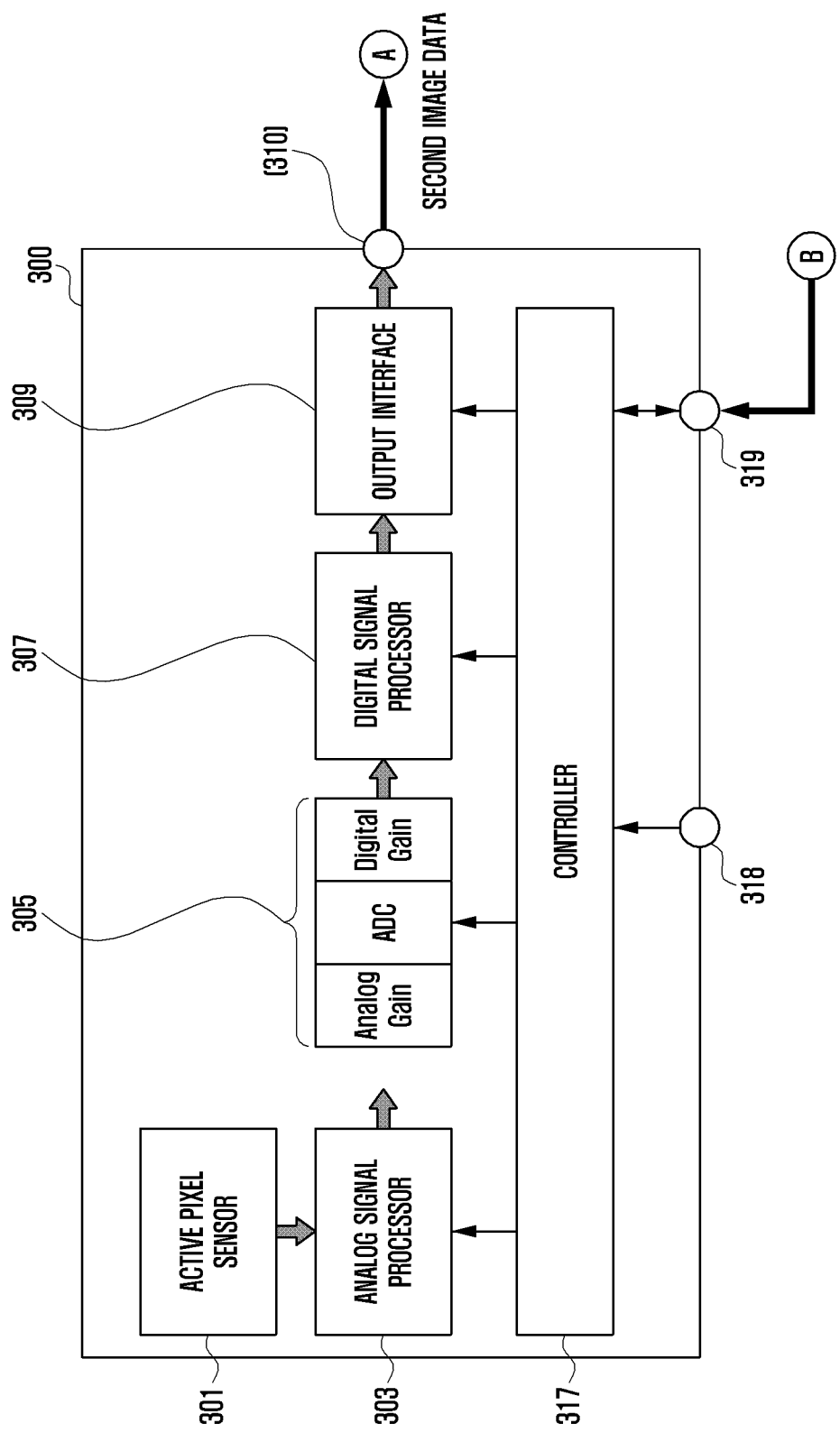
FIG. 3A is a diagram simply illustrating a process in which a plurality of image sensors process image data according to an embodiment of the disclosure.

FIGS. 3A and 3B are diagrams simply illustrating a process in which a plurality of image sensors process image data according to various embodiments of the disclosure.

The electronic device 101 according to various embodiments may include a plurality of image sensors. Although FIGS. 3A and 3B illustrate the contents in which the electronic device 101 includes two image sensors 200 and 300, the number of image sensors that may be included in the electronic device 101 is not limited thereto.

FIG. 3A is a diagram illustrating a process in which a second image sensor generates and outputs second image data according to an embodiment of the disclosure, and FIG. 3B is a diagram illustrating a process in which a first image sensor generates output image data through reception of second image data, and it outputs the generated output image data according to an embodiment of the disclosure.

Referring to FIG. 3B, the first image sensor 200 according to various embodiments may include the same configuration as the configuration of the image sensor illustrated in FIG. 2.

Referring to FIG. 3A, the second image sensor 300 according to various embodiments may be an image sensor that includes the same configuration as the configuration of the first image sensor 200 illustrated in FIG. 2, or it may be a generally used image sensor. The first image sensor 200 and the second image sensor 300 may operate, for example, under the control of the processor 120 of the electronic device 101. In FIG. 3A, to help understanding, the second image sensor 300 is illustrated as a generally used image sensor.

With reference to FIGS. 3A and 3B, according to various embodiments, the first image sensor 200 may include a first active pixel sensor may include a first active pixel sensor 201, an analog signal processor 203, an ADC 205, a first digital signal processor 206, an output interface 209, an output port 210, an input interface 211, an input port 212, a memory 213, a synthesis module 215a or a multiplexer 215b, a controller 217, a control interface 218, and a first synchronizing signal interface 219. According to various embodiments, the second image sensor 300 may include a second active pixel sensor 301, a second analog signal processor 303, a second ADC 305, a second digital signal processor 307, a second output interface 309, a second output port 310, a second controller 317, a second control interface 318, and a second synchronizing signal interface 319.

According to various embodiments, the first image sensor 200 and the second image sensor 300 may operate based on the synchronizing signal provided from the processor 120 of the electronic device 101. For example, the first image sensor 200 and the second image sensor 300 may generate image data by simultaneously capturing images based on the synchronizing signal. The first image sensor 200 may generate first image data through the first pixel sensor, and the second image sensor 300 may generate second image data through the second active pixel sensor 301. For example, the processor 120 of the electronic device 101 may transmit the synchronizing signal to the first synchronizing signal interface 219 of the first image sensor 200 and the second synchronizing signal interface 319 of the second image sensor 300. The synchronizing signal may be, for example, a signal that is a reference of the capturing operations of the first image sensor 200 and the second image sensor 300, and it may be a signal that is a reference when the first image sensor 200 generates the output image data through the synthesis module 215a.

According to various embodiments, the second image sensor 300 may generate and outputs the second image data through the second output port 310. According to various embodiment, the processor 120 may transmits the second image data outputted from the second image sensor 300 to the input port 212 of the first image sensor 200. For example, the electronic device 101 may include an electrical wiring for transmitting the second image data from the second output port 310 of the second image sensor 300 to the input port 212 of the first image sensor 200. The second image data outputted from the second image sensor 300 through the electrical wiring may be transmitted to the first image sensor 200, and it may be stored in the memory 213 of the first image sensor 200.

According to various embodiments, the first image sensor 200 may store the first image data generated by the first active pixel sensor 201 in the memory 213. The first image sensor 200 may receive the second image data outputted from the second image sensor 300 and it may store the received second image data in the memory 213.

According to various embodiments, the first image sensor 200 may generate one piece of output image data by synthesizing the first image data and the second image data in a preconfigured scheme through the synthesis module 215a. According to various embodiments, the first image sensor 200 may generate one piece of output image data by performing cross-synthesis of the first image data and the second image data in the unit of a pixel, a line, or a frame.

According to various embodiments, the first image sensor 200 may output the generated output image data to another constituent element (e.g., processor 120) of the electronic device 101.

The first image sensor 200 according to various embodiments may discriminate common data and difference data by comparatively analyzing the first image data and the second image data, and it may generate one piece of output image data by synthesizing the common data of the first image data and the second image data. According to various embodiments, the first image sensor 200 may discriminate the common data and the difference data of the first image data and the second image data from each other based on at least one of data similarity, color, or contrast (or degree of blurring).

According to various embodiments, the first image sensor 200 may select and output one of the first image data and the second image data through the multiplexer 215b. According to various embodiments, the first image sensor 200 may select and output the first image data and the second image data in the unit of a frame through the multiplexer 215b.

The electronic device 101 according to various embodiments may include a plurality of processors 120. For example, the image processing of the first image sensor 200 may be performed through the control of the first processor, and the image processing of the second image sensor 300 may be performed through the control of the second processor. In this case, the electronic device 101 may distribute images to be processed to the first image sensor 200 and the second image sensor 300 through a demultiplexer (DMUX). According to various embodiments, depth data acquired through a time of flight (ToF) sensor may be processed. For example, among the plurality of processors, the first processor may be a processor that processes the acquired depth data by sensing an infrared signal reflected from an object among infrared signals outputted through the ToF sensor.

According to various embodiments, the first image sensor 200 may be operatively connected to a first optical system, and the second image sensor 300 may be operatively connected to a second optical system. For example, the focal length of the first optical system may be different from the focal length of the second optical system. For example, the focal length of the first optical system may be longer than the focal length of the second optical system. According to various embodiments, the number of effective pixels of the first image sensor 200 may be different from the number of effective pixels of the second image sensor 300. For example, the number of effective pixels of the first image sensor 200 may be larger than the number of effective pixels of the second image sensor 300. The numbers of effective pixels (NEP) may mean, for example, the number of pixels of a part that is used as an actual screen, and as the number of effective pixels becomes larger, the resolution becomes higher.

Referring to FIGS. 4A to 4F, they are diagrams illustrating a method in which an image sensor synthesizes or selects image data according to various embodiments of the disclosure. FIGS. 4A to 4F show examples of image sensor operations by frames.

FIG. 4A is a diagram illustrating a method for generating output image data to be outputted by performing cross-synthesis of first image data generated by an image sensor (e.g., first image sensor 200 of FIG. 3B) and second image data received from an external image sensor (e.g., second image sensor 300 of FIG. 3A) in the unit of a frame according to various embodiments of the disclosure.

Referring to FIG. 4A, according to various embodiments, the first image sensor 200 and the second image sensor 300 may perform image capturing based on the synchronizing signal. For example, the first image sensor 200 and the second image sensor 300 may simultaneously perform the image capturing based on the synchronizing signal. According to various embodiments, the reference numeral [410] denotes a block diagram illustrating a synchronizing signal. The synchronizing signal may be divided, for example, in the unit of a frame.

According to various embodiments, the reference numerals [421] and [423] denote block diagrams illustrating the operations of the first image sensor.

According to various embodiments, the reference numeral [421] denotes a block diagram illustrating an image capturing operation (e.g., pixel-A-1, pixel-A-2) performed by the first active pixel sensor 201 of the first image sensor 200 based on the synchronizing signal. The first image sensor 200 may perform, for example, an image capturing operation through the first active pixel sensor 201 in the unit of a frame of the synchronizing signal, and the image capturing operation may be performed after a predetermine time elapses from a start of each unit of the synchronizing signal.

According to various embodiments, the reference numeral [423] denotes a block diagram illustrating first image data (e.g., data-A-1, data-A-2) generated by the first active pixel sensor 201 of the first image sensor 200 to process an electrical signal generated through the image capturing operation. For example, it is assumed that data-A-1 is included in frame 1 of the first image data, and data-A-2 is included in frame 2 thereof.

According to various embodiments, the reference numerals [431] and [433] denote block diagrams illustrating the operations of the second image sensor.

According to various embodiments, the reference numeral [431] denotes a block diagram illustrating an image capturing operation (e.g., pixel-B-1, pixel-B-2) performed by the second active pixel sensor 301 of the second image sensor 300 based on the synchronizing signal. The second image sensor 300 may perform, for example, an image capturing operation through the second active pixel sensor 301 in the unit of a frame of the synchronizing signal, and the image capturing operation may be performed after a predetermine time elapses from a start of each unit of the synchronizing signal.

According to various embodiments, the reference numeral [433] denotes a block diagram illustrating second image data (e.g., data-B-1, data-B-2) generated by the second active pixel sensor 301 of the second image sensor 300 to process an electrical signal generated through the image capturing operation. For example, it is assumed that data-B-1 is included in frame 1 of the second image data, and data-B-2 is included in frame 2 thereof.

According to various embodiments, the reference numeral [441] denotes a block diagram illustrating storage and synthesis of the first image data and the second image data through the memory 213 and the synthesis module 215a of the first image sensor 200. According to various embodiments, the processor 120 of the electronic device 101 may control to transmit the second image data outputted from the second image sensor 300 as the first image data. The first image sensor 200 according to various embodiments may store the generated first image data and the received second image data in the memory 213. The first image sensor 200 may generate and output the output image data by synthesizing the first image data and the second image data through the first synthesis module.

According to various embodiments, the reference numeral [451] denotes a block diagram illustrating output image data generated by the first image sensor 200 to perform cross-synthesis of the first image data and the second image data by frames through the synthesis module 215a. For example, the first image sensor 200 may perform cross-synthesis of data-A-1 of the first image data and data-B-1 of the second image data in order in frame 1. In this case, the output image data outputted through the first image sensor 200 may include data obtained by synthesizing data-A-1 and data-B-1 in frame 1, and it may include data obtained by synthesizing data-A-2 and data-B-2 in frame 2. The first image sensor 200 may output the output image data obtained by performing cross-synthesis of the first image data and the second image data by frames to other constituent elements of the electronic device.

Figure 4B:
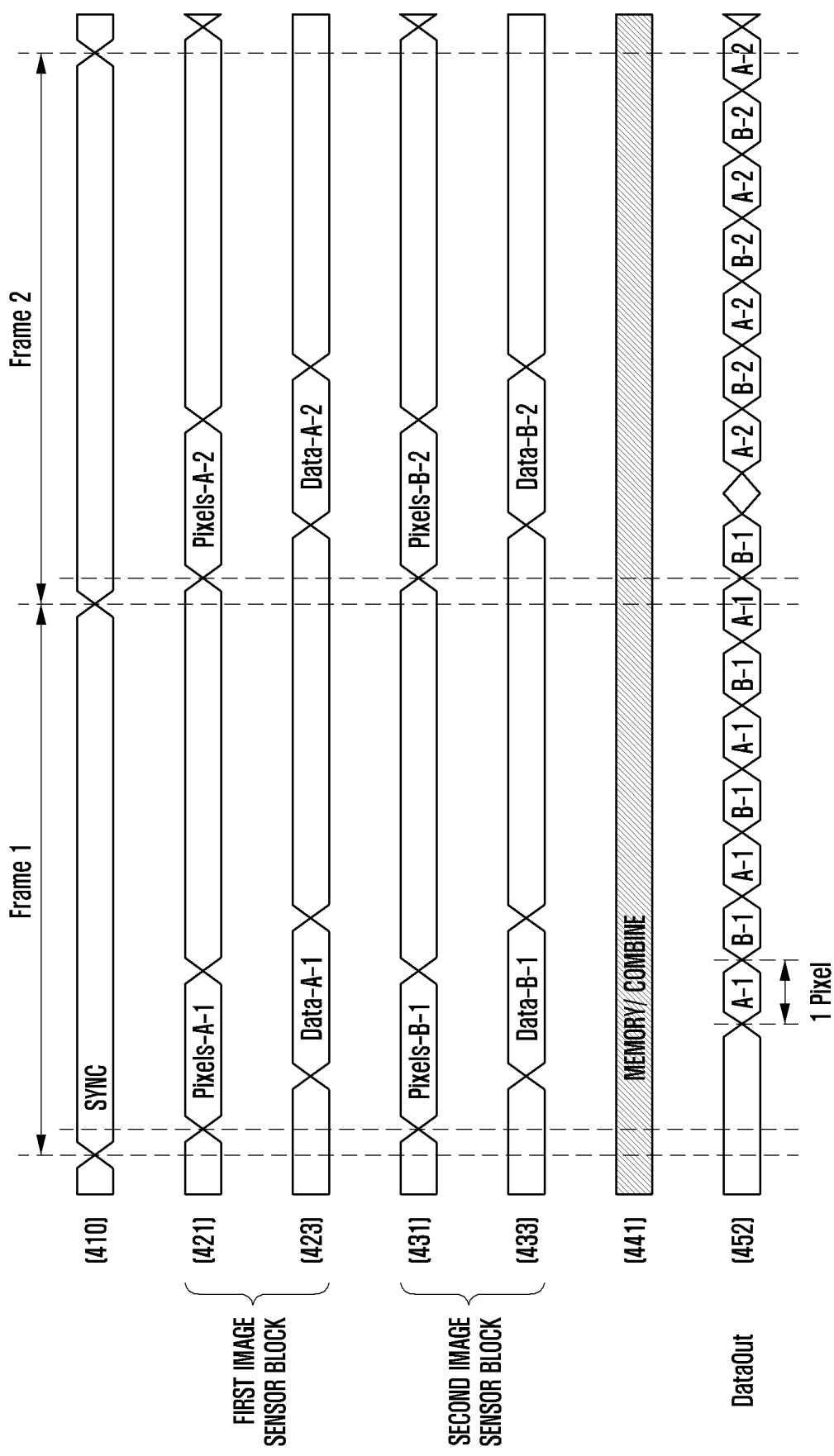
FIG. 4B is a diagram illustrating a method in which an image sensor synthesizes or selects image data according to an embodiment of the disclosure.

FIG. 4B is a diagram illustrating a method for generating output image data to be outputted by performing cross-synthesis of the first image data generated by the first image sensor 200 and the second image data received from the second image sensor 300 in the unit of a pixel according to an embodiment of the disclosure. The explanation of the contents overlapping the contents described above with reference to FIG. 4A will be omitted.

According to various embodiments, the reference numeral [423] denotes a block diagram illustrating first image data (e.g., data-A-1, data-A-2) generated by the first active pixel sensor 201 of the first image sensor 200 to process an electrical signal generated through the image capturing operation. Each frame of the first image data may include a plurality of pixels.

According to various embodiments, the reference numeral [433] denotes a block diagram illustrating second image data (e.g., data-B-1, data-B-2) generated by the second active pixel sensor 301 of the second image sensor 300 to process an electrical signal generated through the image capturing operation. Each frame of the second image data may include a plurality of pixels.

According to various embodiments, the reference numeral [452] denotes a block diagram illustrating output image data generated by the first image sensor 200 to perform cross-synthesis of the first image data and the second image data by pixels through the synthesis module 215a. For example, the first image sensor 200 may perform cross-synthesis of a plurality of pixels included in data-A-1 of the first image data and a plurality of pixels included in data-B-1 of the second image data in order in frame 1. In this case, the output image data outputted through the first image sensor 200 may include data obtained by performing cross-synthesis of data-A-1 and data-B-1 by pixels in frame 1, and it may include data obtained by performing cross-synthesis of data-A-2 and data-B-2 by pixels in frame 2. The first image sensor 200 may output the output image data obtained by performing cross-synthesis of the first image data and the second image data by pixels.

Figure 4C:
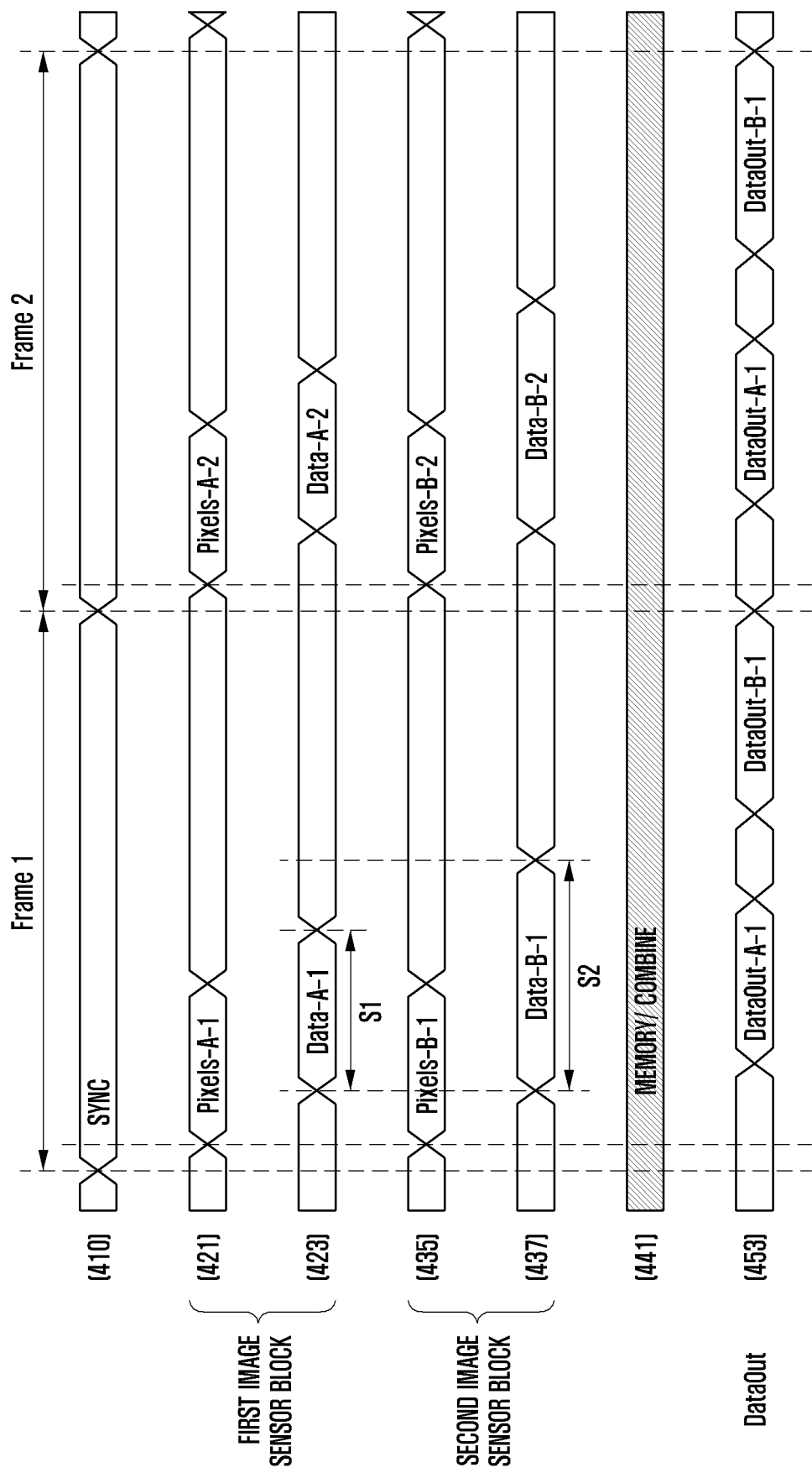
FIG. 4C is a diagram illustrating a method in which an image sensor synthesizes or selects image data according to an embodiment of the disclosure.

FIG. 4C is a diagram illustrating a method for generating output image data to be outputted by performing cross-synthesis of the first image data generated by the first image sensor 200 and the second image data received from the second image sensor 300 in the unit of a frame according to an embodiment of the disclosure. According to various embodiments, the data size s1 of the first image data may be different from the data size s2 of the second image data. The explanation of the contents overlapping the contents described above with reference to FIG. 4A will be omitted.

According to various embodiments, the reference numeral [423] denotes a block diagram illustrating first image data (e.g., data-A-1, data-A-2) generated by the first active pixel sensor 201 of the first image sensor 200 to process an electrical signal generated through the image capturing operation. For example, it is assumed that the size of data-A-1 that is data included in frame 1 of the first image data is s1.

According to various embodiments, the reference numerals [435] and [437] denote block diagrams illustrating the operations of the second image sensor.

According to various embodiments, the reference numeral [435] denotes a block diagram illustrating an image capturing operation (e.g., pixel-B-1, pixel-B-2) performed by the second active pixel sensor 301 of the second image sensor 300 based on the synchronizing signal.

According to various embodiments, the reference numeral [437] denotes a block diagram illustrating second image data (e.g., data-B-1, data-B-2) generated by the second active pixel sensor 301 of the second image sensor 300 to process an electrical signal generated through the image capturing operation. For example, it is assumed that the size of data-B-1 that is data included in frame 1 of the second image data is s2. The size s1 of data-A-1 and the size s2 of data-B-1 may be different from each other.

According to various embodiments, the reference numeral [453] denotes a block diagram illustrating output image data generated by the first image sensor 200 to perform cross-synthesis of the first image data and the second image data by frames through the synthesis module 215a. For example, the first image sensor 200 may perform cross-synthesis of data-A-1 of the first image data and data-B-1 of the second image data in order in frame 1. If data-A-1 of the first image data and data-B-1 of the second image data have different sizes, the first image sensor 200 may perform cross-synthesis of the first image data and the second image data by frames to output the cross-synthesized image data.

According to various embodiments, if the size of the first image data and the size of the second image data are different from each other, the first image sensor may synthesize the image data by adding padding data to the image data having a smaller size. For example, if the size s1 of data-A-1 of the first image data is smaller than the size s2 of data-B-1 of the second image data, the first image sensor 200 may add the padding data to data-A-1 and it may synthesize data-A-1 added with the padding data and data-B-1. The padding data may be, for example, data including a blank or meaningless sign. In this case, the size of the padding data to be added to data-A-1 may be s2−s1. According to various embodiments, if the size of the first image data is different from the size of the second image data, the first image sensor 200 may dividedly synthesize the image data having a larger size.

Figure 4D:
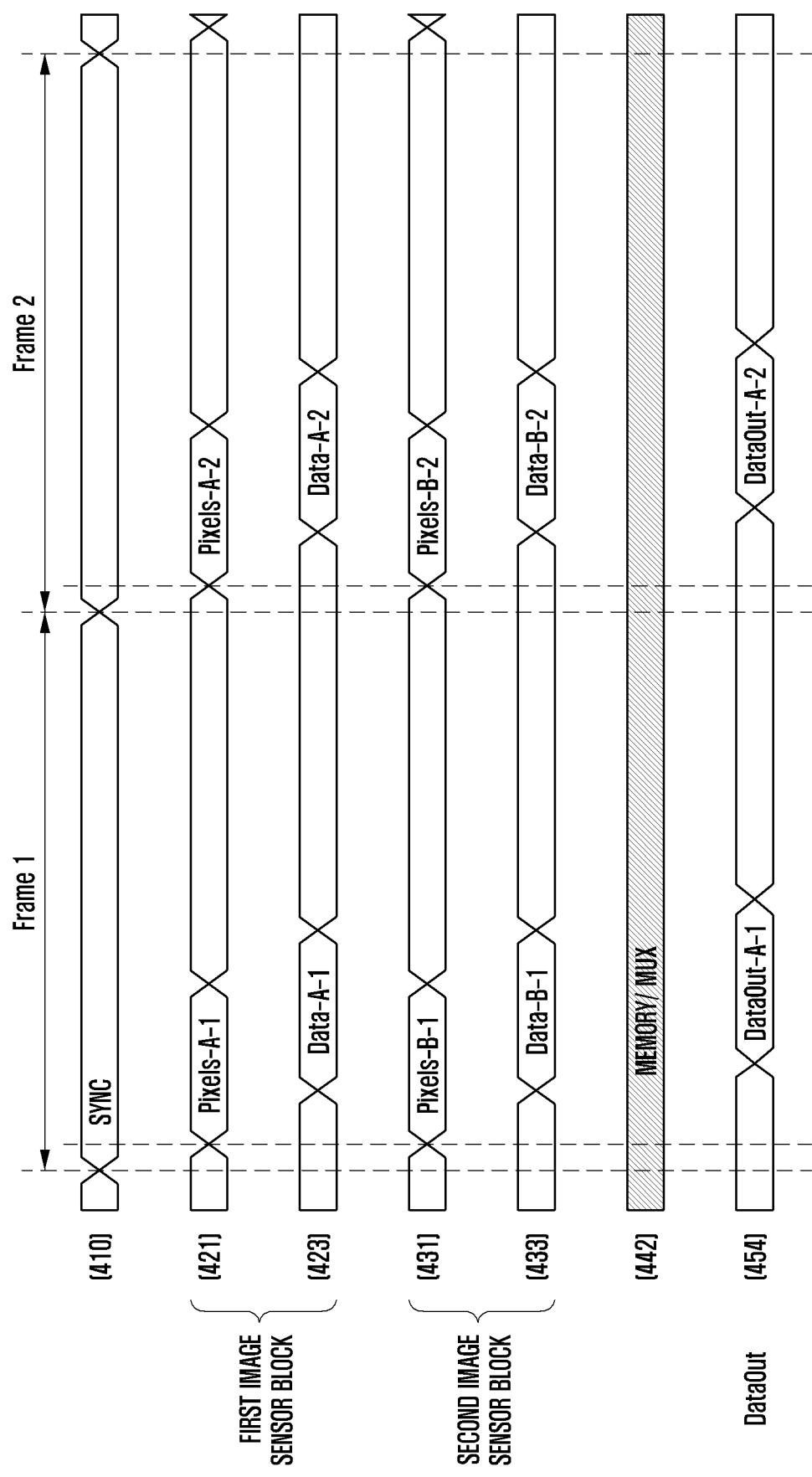
FIG. 4D is a diagram illustrating a method in which an image sensor synthesizes or selects image data according to an embodiment of the disclosure.

FIG. 4D is a diagram illustrating a method for generating image data to be outputted by selecting one of the first image data generated by the first image sensor 200 and the second image data received from the second image sensor 300 according to an embodiment of the disclosure. The explanation of the contents overlapping the contents described above with reference to FIG. 4A will be omitted.

According to various embodiments, the reference numeral [442] denotes a block diagram illustrating storing of the first image data and the second image data and selection of data to be outputted through the memory 213 and the multiplexer 215b of the first image sensor 200. According to various embodiments, the processor 120 of the electronic device 101 may control to transmit the second image data outputted from the second image sensor 300 as the first image data. The first image sensor 200 according to various embodiments may store the generated first image data and the received second image data in the memory 213. The first image sensor 200 may select and output one of the first image data and the second image data through the multiplexer 215b.

According to various embodiments, the reference numeral [454] denotes a block diagram illustrating the image data to be selected and outputted by the first image sensor 200 through selection of one of the first image data and the second image data through the multiplexer 215b. The first image sensor 200 may select and output, for example, the first image data. In this case, dataout-A-1 included in the image data to be outputted from the first image sensor 200 may be the same data as data-A-1 of the first image data of the reference numeral [423]. In the same manner, dataout-A-2 included in the image data to be outputted from the first image sensor 200 may be the same data as data-A-2 of the first image data.

Figure 4E:
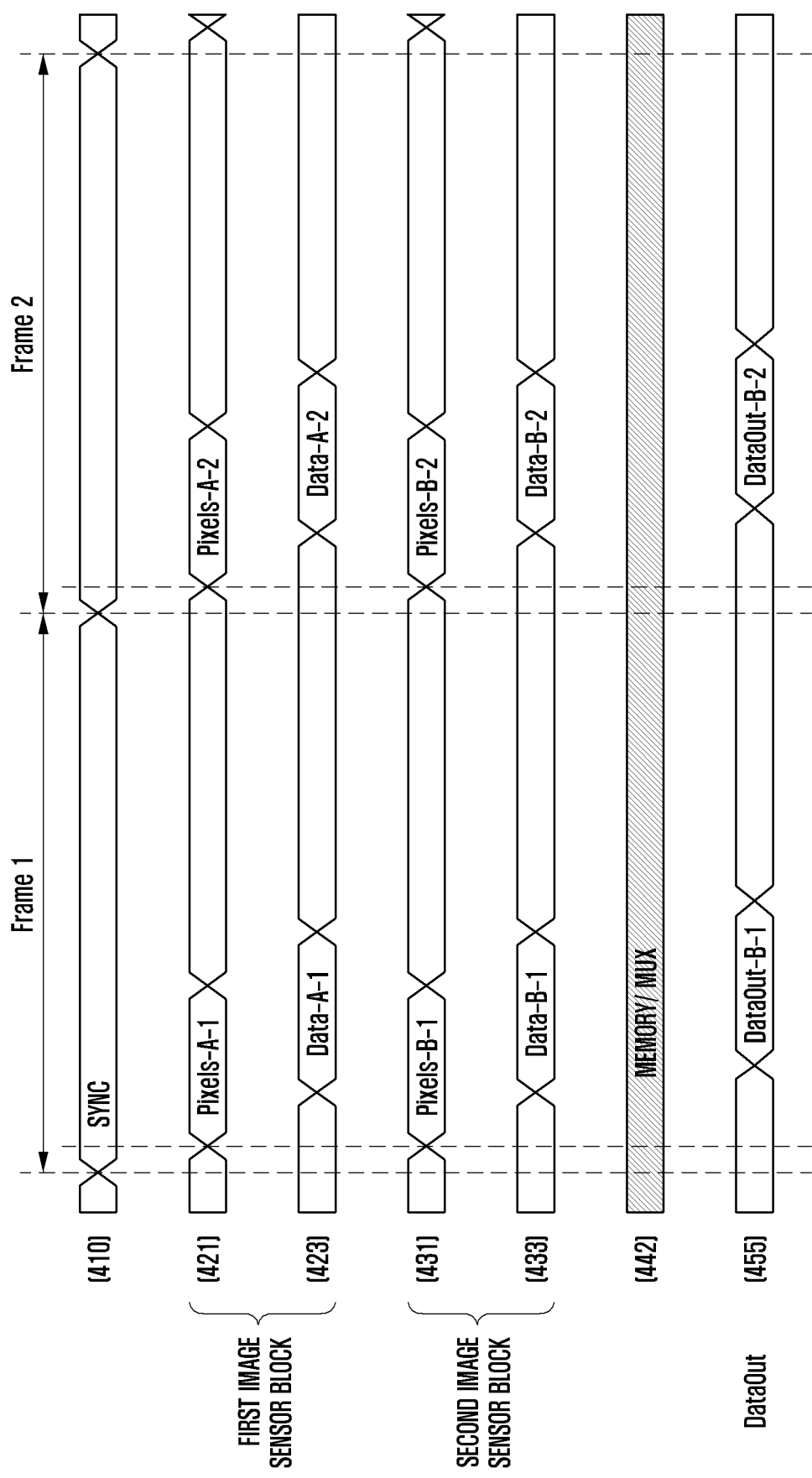
FIG. 4E is a diagram illustrating a method in which an image sensor synthesizes or selects image data according to an embodiment of the disclosure.

FIG. 4E is a diagram illustrating a method for generating image data to be outputted by selecting one of the first image data generated by the first image sensor 200 and the second image data received from the second image sensor 300 according to an embodiment of the disclosure. The explanation of the contents overlapping the contents described above with reference to FIG. 4A will be omitted.

According to various embodiments, the reference numeral [442] denotes a block indicating storing of the first image data and the second image data and selection of data to be outputted through the memory 213 and the multiplexer 215b of the first image sensor 200. According to various embodiments, the processor 120 of the electronic device 101 may control to transmit the second image data outputted from the second image sensor 300 as the first image data. The first image sensor 200 according to various embodiments may store the generated first image data and the received second image data in the memory 213. The first image sensor 200 may select and output one of the first image data and the second data through the multiplexer 215b.

According to various embodiments, the reference numeral [442] denotes a block indicating storing of the first image data and the second image data and selection of data to be outputted through the memory 213 and the multiplexer 215b of the first image sensor 200. According to various embodiments, the first image sensor 200 may select and output the first image data and the second image data in the unit of a frame.

According to various embodiments, the reference numeral [455] denotes a block diagram illustrating the image data to be outputted by selecting one of the first image data and the second image data through the multiplexer 215b of the first image sensor 200. The first image sensor 200 may select and output, for example, the second image data. In this case, dataout-B-1 included in the image data to be outputted from the first image sensor 200 may be the same data as data-B-1 of the second image data of the reference numeral [433]. In the same manner, dataout-B-2 included in the image data to be outputted from the first image sensor 200 may be the same data as data-B-2 of the first image data.

Figure 4F:
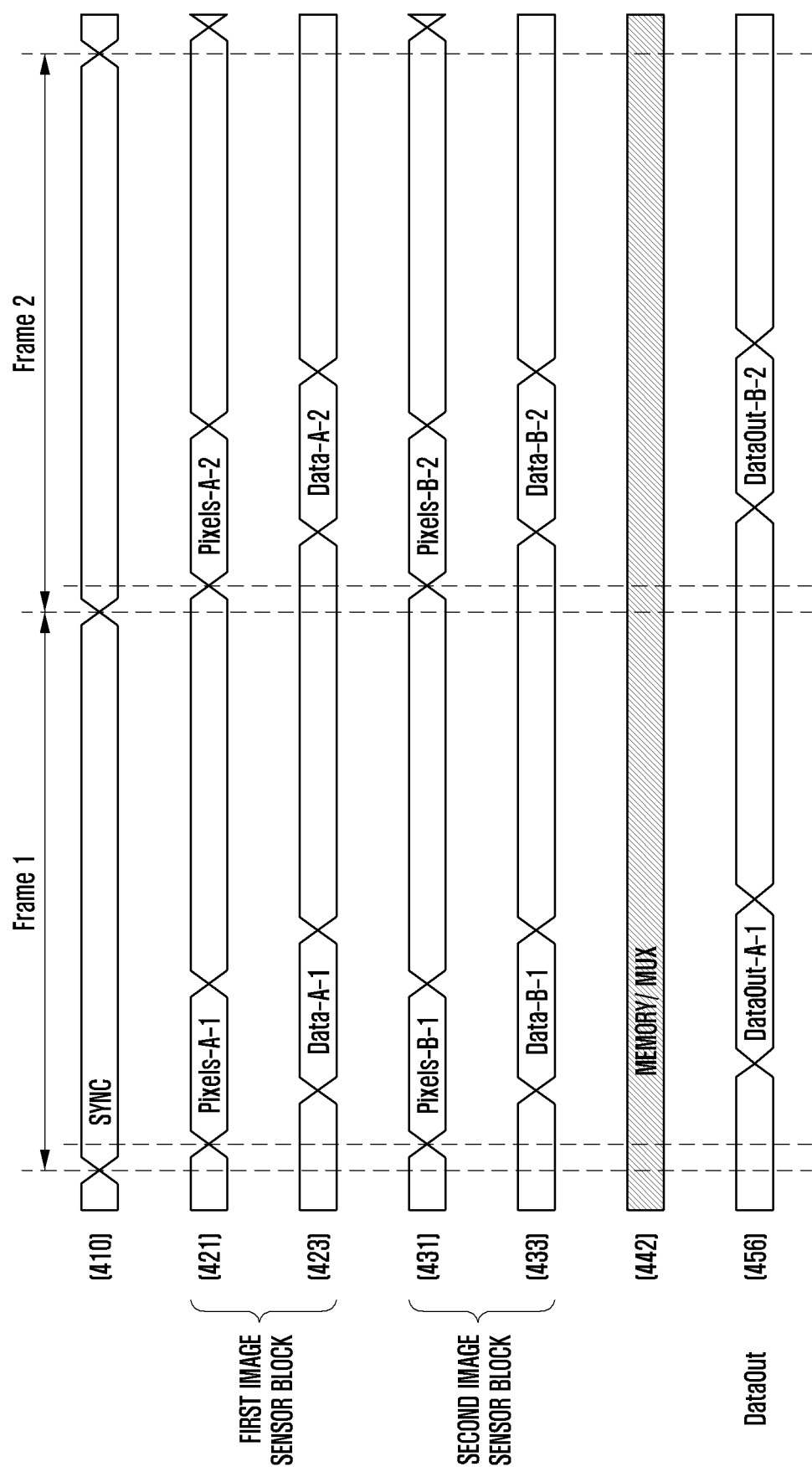
FIG. 4F is a diagram illustrating a method in which an image sensor synthesizes or selects image data according to an embodiment of the disclosure.

FIG. 4F is a diagram illustrating a method for selecting and outputting the first image data generated by the first image sensor 200 and the second image data received from the second image sensor 300 according to an embodiment of the disclosure. The explanation of the contents overlapping the contents described above with reference to FIG. 4A will be omitted.

According to various embodiments, the reference numeral [456] denotes a block diagram illustrating image data to be outputted by selecting one of the first image data and the second image data in accordance with a time through the multiplexer 215b of the first image sensor 200.

According to various embodiments, the first image sensor 200 may generate the output image by selecting one piece of data included in the first image data and the second image data in accordance with the time when respective frames are captured. For example, the first image sensor 200 may generate an image to be outputted by selecting data-A-1 that is data included in the first image data at the time when frame 1 is captured and by selecting data-B-2 that is data included in the second image data at the time when frame 2 is captured. In this case, dataout-A-1 included in the image data to be outputted through the first image sensor 200 may be the same data as data-A-1 of the first image data of the reference numeral [423], and dataout-B-2 included in the image data to be outputted through the first image sensor 200 may be the same data as data-B-2 of the second image data of the reference numeral [433].

Figure 5:
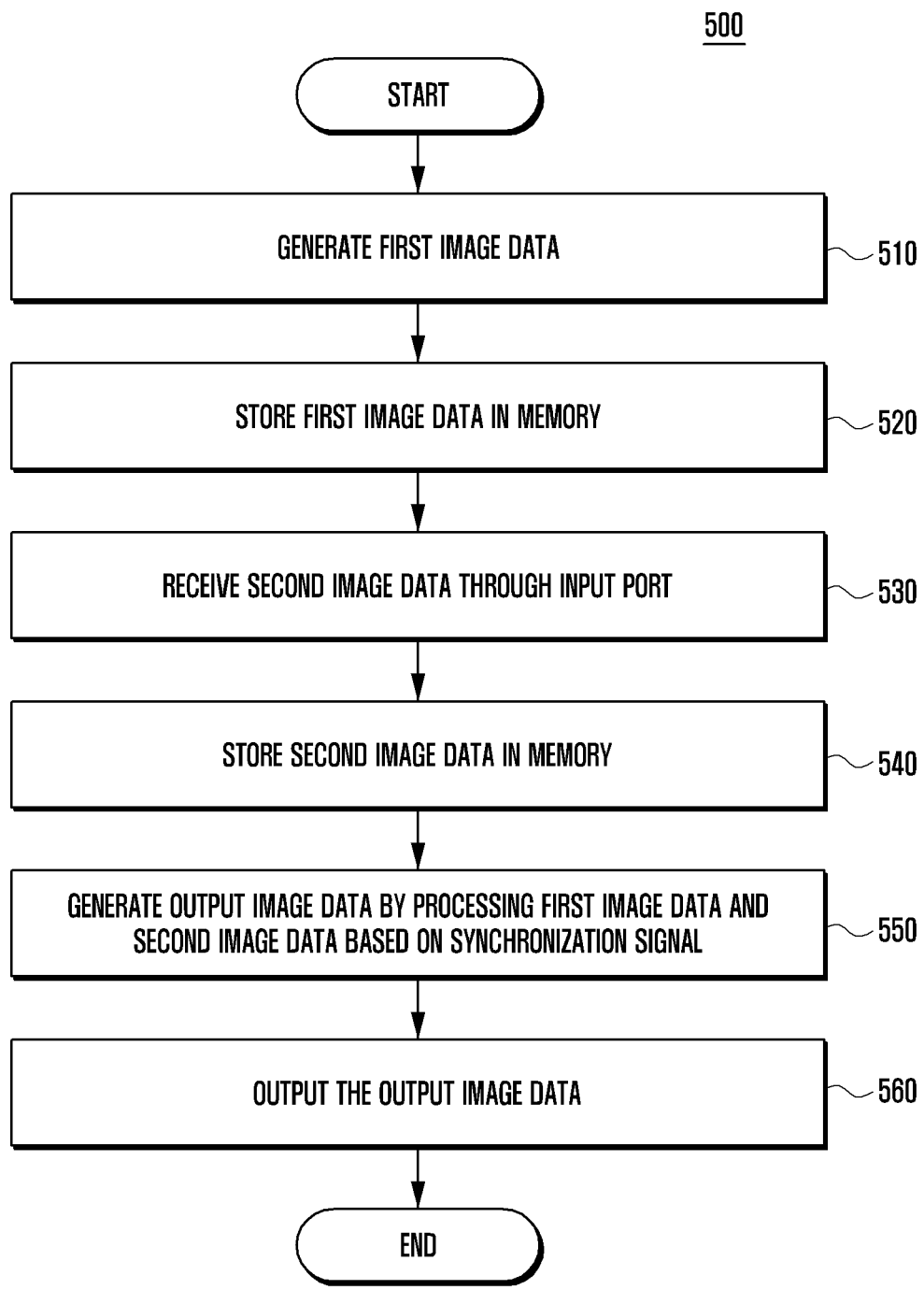
FIG. 5 is a flowchart illustrating an operation of an image sensor according to an embodiment of the disclosure.

FIG. 5 is a flowchart illustrating an operation of an image sensor according to an embodiment of the disclosure.

Referring to FIG. 5, with reference to an operational flowchart 500, the controller 217 of the first image sensor 200 according to various embodiments, at operation 510, may generate first image data using a signal sensed through the pixel sensor. For example, the controller 217 may control the first active pixel sensor 201 to perform a capturing operation based on the synchronizing signal.

According to various embodiments, at operation 520, the controller 217 of the first image sensor 200 may store the generated first image data in the memory 213.

According to various embodiments, at operation 530, the controller 217 of the image sensor may receive second image data from the external image sensor (second image sensor 300 of FIG. 3A) through the input port 212.

According to various embodiments, at operation 540, the controller 217 of the first image sensor 200 may store the received second image data in the memory 213.

According to various embodiments, at operation 550, the controller 217 of the first image sensor 200 may generate the output image data by processing the first image data and the second image data through the synthesis module 215a based on the synchronizing signal.

According to various embodiments, at operation 560, the controller 217 of the first image sensor 200 may output the generated output image data through the output port 210.

Figure 6:
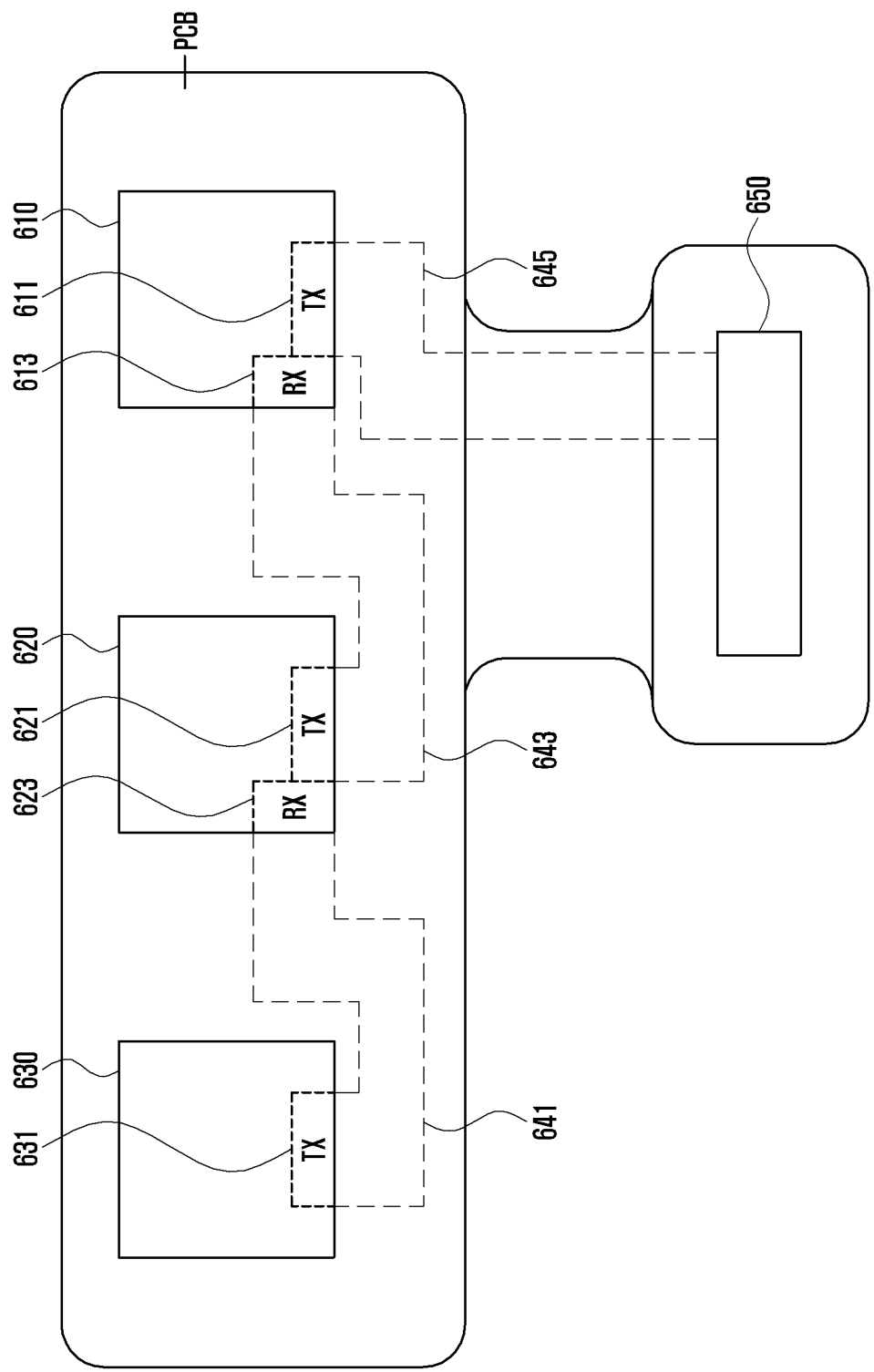
FIG. 6 is a diagram explaining wiring design of a plurality of image sensors included in an electronic device according to an embodiment of the disclosure.

FIG. 6 is a diagram explaining a wiring design of a plurality of image sensors included in an electronic device according to an embodiment of the disclosure.

Referring to FIG. 6, the electronic device 101 according to various embodiments of the disclosure may include a plurality of image sensors. FIG. 6 illustrates a state that the electronic device 101 includes three image sensors. Although FIG. 6 illustrates that the electronic device 101 includes three image sensors, the number of image sensors that may be included in the electronic device 101 is not limited thereto.

A first image sensor 610 and a second image sensor 620 according to various embodiments may include the same configuration as the first image sensor 200 illustrated in FIG. 2. A third image sensor 630 according to various embodiments may be an image sensor including the same configuration as the first image sensor 200 illustrated in FIG. 2, or it may be a generally used image sensor. The first image sensor 610, the second image sensor 620, and the third image sensor 630 may operate, for example, under the control of the processor 120 of the electronic device 101.

According to various embodiments, the first image sensor 610 may be connected to another constituent element (e.g., processor 120) of the electronic device 101 through a connector 650. For example, the first image sensor 610 may be electrically connected to another constituent element (e.g., processor 120 of FIG. 1) of the electronic device through an electrical wiring 645 between an output port 611 of the first image sensor 610 and the connector 650. The first image sensor 610 may output the output image data that is processed through the electrical wiring 645.

According to various embodiments, the second image sensor 620 may be electrically connected to the first image sensor 610. For example, the second image sensor 620 may be electrically connected to the first image sensor 610 through an electrical wiring 643 between an output port 621 of the second image sensor 620 and an input port 613 of the first image sensor 610. The second image sensor 620 may transmit the image data to the first image sensor 610 through the electrical wiring 643.

According to various embodiments, the third image sensor 630 may be electrically connected to the second image sensor 620. For example, the third image sensor 630 may be electrically connected to the second image sensor 620 through an electrical wiring 641 between an output port 631 of the third image sensor 630 and an input port 623 of the second image sensor 620. The third image sensor 630 may transmit the image data to the second image sensor 620 through the electrical wiring 641.

The processor 120 of the electronic device 101 according to various embodiments may transmit the synchronizing signal to the first image sensor 610, the second image sensor 620, and the third image sensor 630, and it may control the first to third image sensors to simultaneously perform capturing operations based on the synchronizing signal. Based on the synchronizing signal, the first image sensor 610 may generate the first image data, the second image sensor 620 may generate the second image data, and the third image sensor 630 may generate the third image data.

The processor 120 of the electronic device 101 according to various embodiments may control the third image sensor 630 to transmit the generated third image data to the second image sensor 620. For example, the third image data may be transmitted to the second image sensor 620 through the electrical wiring 641 between the output port 631 of the third image sensor 630 and the input port 623 of the second image sensor 620.

The processor 120 of the electronic device 101 according to various embodiments may control the second image sensor 620 to synthesize or select the generated second image data and the received third image data in a preconfigured scheme. For example, the second image sensor 620 may generate first output image data by synthesizing the second image data and the third image data in the preconfigured scheme through the synthesis module (e.g., synthesis module 215a of FIG. 2) of the second image sensor 620. For example, the second image sensor 620 may generate the first output image data by selecting one of the second image data and the third image data through the multiplexer (e.g., multiplexer 215b of FIG. 2) of the second image sensor 620.

The processor 120 of the electronic device 101 according to various embodiments may output the generated first output image data. For example, the processor 120 may control to transmit the first output image data to the first image sensor 610. For example, the first output image data may be transmitted to the first image sensor 610 through the electrical wiring 643 between the output port 621 of the second image sensor 620 and the input port 613 of the first image sensor 610.

The processor 120 of the electronic device 101 according to various embodiments may control the first image sensor 610 to synthesize or select the generated first image data and the received first output image data in a preconfigured scheme. For example, the first image sensor 610 may generate second output image data by synthesizing the first image data and the first output image data in the preconfigured scheme through the synthesis module (e.g., synthesis module 215a of FIG. 2) of the first image sensor 610. For example, the first image sensor 610 may generate the second output image data by selecting one of the first image data and the first output image data through the multiplexer (e.g., multiplexer 215b of FIG. 2) of the first image sensor 610.

The processor 120 of the electronic device 101 according to various embodiments may output the second output image data generated by the first image sensor 610. For example, the processor 120 may control to transmit the second output image data to another constituent element of the electronic device 101 through the connector 650. For example, the second output image data may be transmitted to another constituent element of the electronic device 101 through the electrical wiring 645 between the output port 611 of the first image sensor 610 and the connector 650.

The electronic device 101 according to various embodiments of the disclosure may output one piece of image data by synthesizing or selecting the image data generated by the plurality of image sensors using the above-described method within the image sensor. According to various embodiments, one image sensor may be connected to the connector without the necessity of connecting the respective image sensors to the connector, and one piece of processed image data can be outputted.

Figure 7:
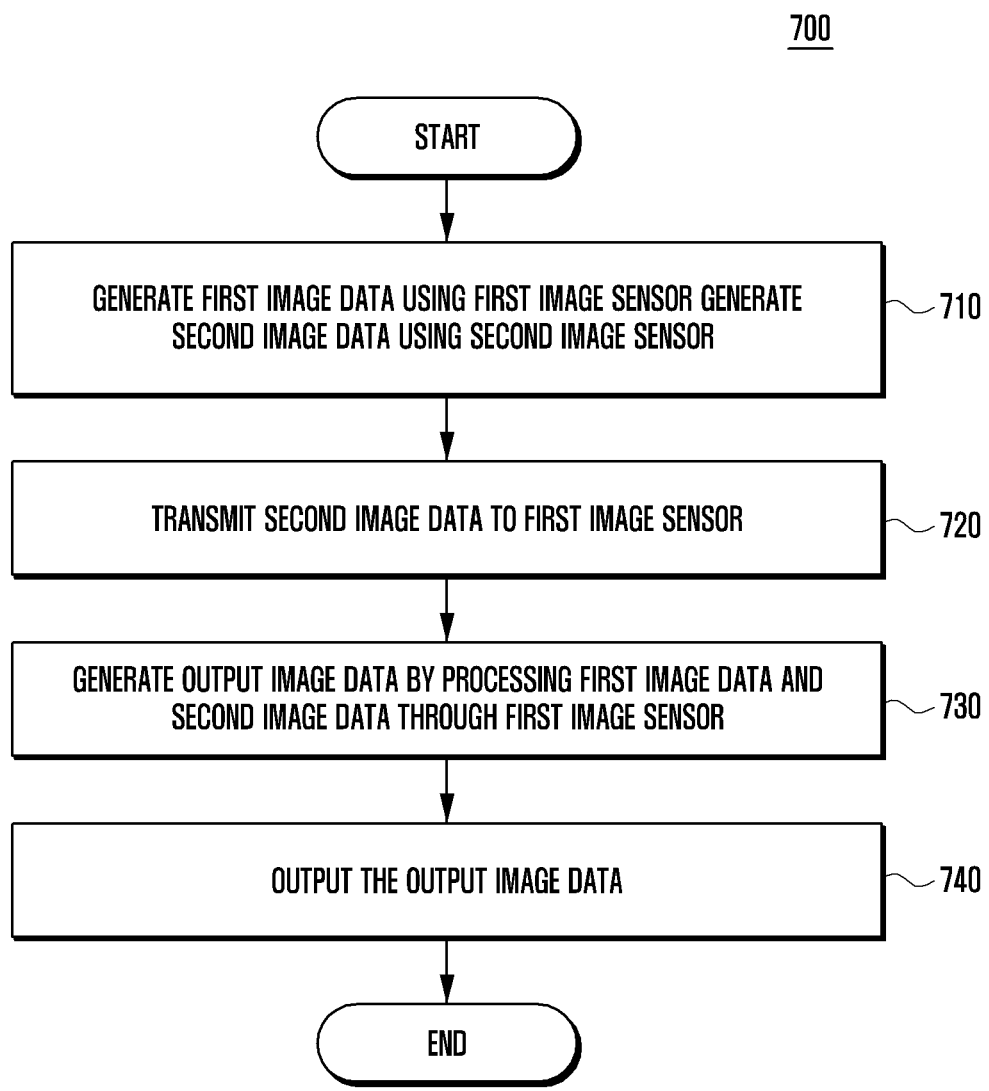
FIG. 7 is a flowchart illustrating an operation of an electronic device according to an embodiment of the disclosure.

FIG. 7 is a flowchart illustrating an operation of an electronic device according to an embodiment of the disclosure.

Referring to FIG. 7, it is an operational flowchart in the case where the electronic device 101 according to various embodiments includes two image sensors.

With reference to an operational flowchart 700, the processor 120 of the electronic device 101 according to various embodiments, at operation 710, may control to generate the first image data and the second image data through the first image sensor (e.g., first image sensor 200 of FIG. 3B) and the second image sensor (e.g., second image sensor 300 of FIG. 3A). The processor 120 may control the first image sensor to generate the first image data, and it may control the second image sensor to generate the second image data. For example, the processor 120 of the electronic device 101 may transmit the synchronizing signal to the first image sensor and the second image sensor, and it may control the first image sensor and the second image sensor to simultaneously perform the image capturing operation and to generate the image data.

At operation 720, the processor 120 of the electronic device 101 according to various embodiments may control the second image sensor to transmit the second image data generated by the second image sensor to the first image sensor. For example, the second image data may be transmitted to the first image sensor through the electrical wiring between the output port of the second image sensor and the input port of the first image sensor.

At operation 730, the processor 120 of the electronic device 101 according to various embodiments may control the first image sensor to process and output the first image data and the second image data. For example, the processor 120 may control the first image sensor to generate the output image data by synthesizing the first image data and the second image data in the preconfigured scheme based on the synchronizing signal.

For example, the processor 120 of the electronic device 101 according to various embodiments, at operation 740, may control to output the output image data generated by the first image sensor to another constituent element of the electronic device 101. For example, the output image data may be transmitted to another constituent element of the electronic device 101 through the electrical wiring between the output port of the first image sensor and the connector.

Figure 8:
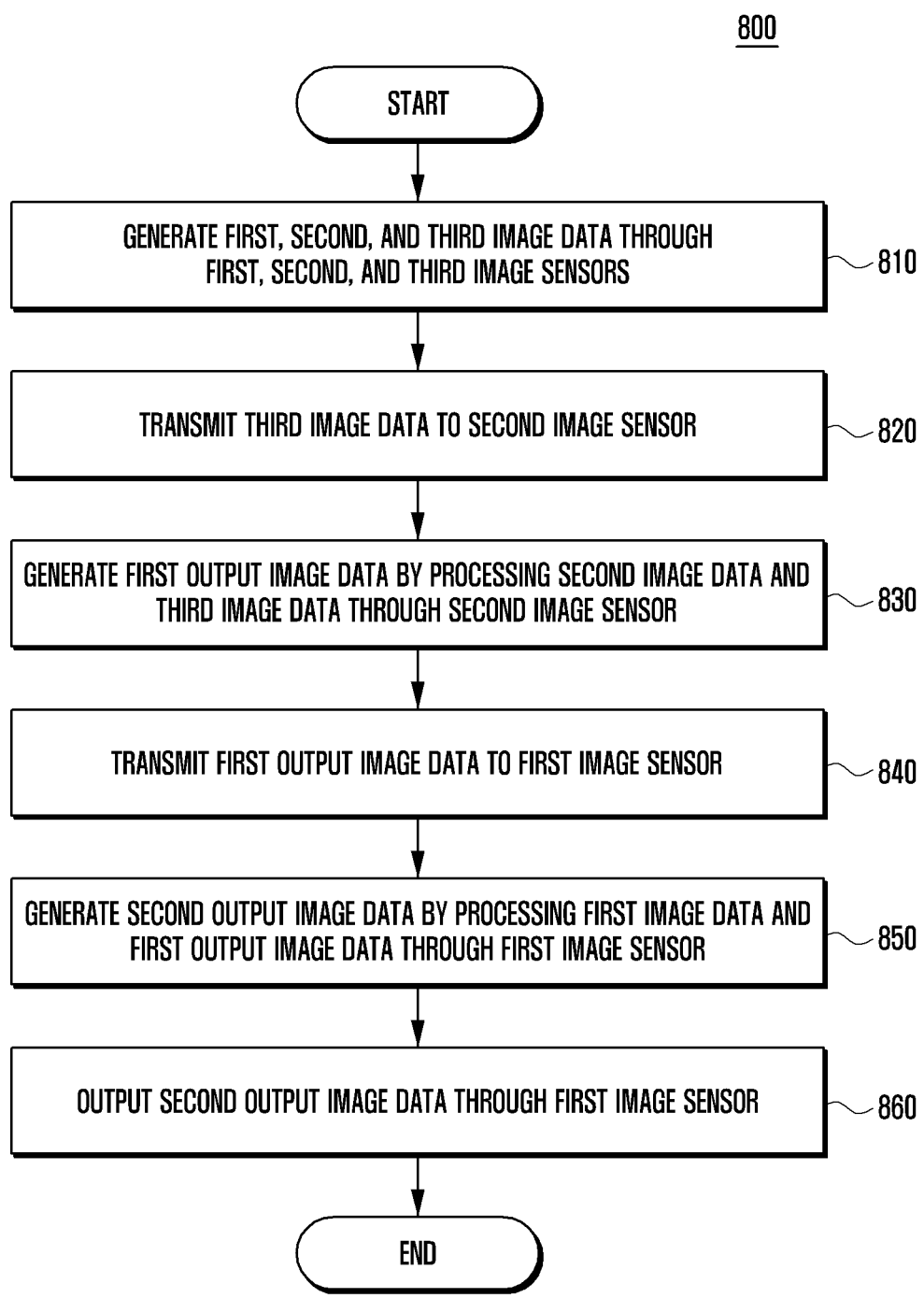
FIG. 8 is a flowchart illustrating an operation of an electronic device according to an embodiment of the disclosure.

FIG. 8 is a flowchart illustrating an operation of an electronic device 101 according to an embodiment of the disclosure.

Referring to FIG. 8, it is an operational flowchart in the case where the electronic device 101 according to various embodiments includes three image sensors.

With reference to an operational flowchart 800, the processor 120 of the electronic device 101 according to various embodiments, at operation 810, may control to generate the first image data, the second image data, and the third image data through the first image sensor (e.g., first image sensor 610 of FIG. 6), the second image sensor (e.g., second image sensor 620 of FIG. 6), and the third image sensor (e.g., third image sensor 630 of FIG. 6), respectively. For example, the processor 120 of the electronic device 101 may transmit the synchronizing signal to the first image sensor, the second image sensor, and the third image sensor, and it may control the first image sensor, the second image sensor, and the third image sensor to simultaneously perform image capturing operations and to generate the image data. For example, the processor 120 may control to generate the first image data using the first image sensor, to generate the second image data using the second image sensor, and to generate the third image data using the third image sensor.

At operation 820, the processor 120 of the electronic device 101 according to various embodiments may control to transmit the third image data generated by the third image sensor to the second image sensor. For example, the third image data may be transmitted to the second image sensor through the electrical wiring (e.g., electrical wiring 641 of FIG. 6) between the output port (e.g., output port 631 of the third image sensor 630 of FIG. 6) of the third image sensor and the input port (input port 623 of the second image sensor of FIG. 6) of the second image sensor.

At operation 830, the processor 120 of the electronic device 101 according to various embodiments may control the second image sensor to generate the first image data by processing the second image data and the third image data. For example, the processor 120 may control the second image sensor to generate the first output image data by processing the second image data and the third image data in the preconfigured scheme based on the synchronizing signal.

At operation 840, the processor 120 of the electronic device 101 according to various embodiments may control the second image sensor to transmit the first output image data to the first image sensor. For example, the output image data may be transmitted to the first image sensor through the electrical wiring (e.g., electrical wiring 643 of FIG. 6) between the output port (e.g., output port 621 of the second image sensor of FIG. 6) of the second image sensor and the input port (e.g., input port 613 of the first image sensor of FIG. 6) of the first image sensor.

At operation 850, the processor 120 of the electronic device 101 according to various embodiments may control the first image sensor to generate the second output image data by processing the first image data and the first output image data. For example, the processor 120 may control the first image sensor to generate the second output image data by processing the first image data and the first output image data in the preconfigured scheme based on the synchronizing signal.

At operation 860, the processor 120 of the electronic device 101 according to various embodiments may control to output the second output image data generated by the first image sensor to another constituent element of the electronic device 101. For example, the second output image data may be transmitted to another constituent element of the electronic device 101 through the electrical wiring (e.g., electrical wiring 645 of FIG. 6) between the output port of the first image sensor (e.g., output port 61 of the first image sensor of FIG. 6) and the connector (e.g., connector 645 of FIG. 6).

An electronic device 101 according to various embodiments of the disclosure may include a first image sensor 200, a second image sensor 300 electrically connected to the first image sensor 200, and a processor 120 operatively connected to the first image sensor 200 and the second image sensor 300. The processor 120 according to various embodiments of the disclosure may be configured to generate first image data using the first image sensor 200 and generate second image data using the second image sensor 300 based on a synchronizing signal, transmit the second image data generated by the second image sensor 300 to the first image sensor 200, and control the first image sensor 200 to generate and output output image data by processing the first image data and the second image data based on the synchronizing signal.

In the electronic device 101 according to various embodiments of the disclosure, the processor 120 may be configured to transmit the synchronizing signal to the first image sensor 200 and the second image sensor 300, and control the first image sensor 200 and the second image sensor 300 to simultaneously generate the image data based on the synchronizing signal.

In the electronic device 101 according to various embodiments of the disclosure, the processor 120 may be configured to control the first image sensor 200 to generate and output the output image data by performing cross-synthesis of the first image data and the second image data in the unit of a frame based on the synchronizing signal.

In the electronic device 101 according to various embodiments of the disclosure, the processor 120 may be configured to control the first image sensor 200 to generate and output the output image data by performing cross-synthesis of the first image data and the second image data in the unit of a pixel based on the synchronizing signal.

In the electronic device 101 according to various embodiments of the disclosure, the processor 120 may be configured to control the first image sensor 200 to generate and output the output image data by performing cross-synthesis of the first image data and the second image data in the unit of a frame based on the synchronizing signal if the number of pixels of the first image data and the number of pixels of the second image data are different from each other.

In the electronic device 101 according to various embodiments of the disclosure, the processor 120 may be configured to control the first image sensor 200 to add padding data to the image data having a smaller size between the first image data and the second image data and to synthesize the image data added with the padding data.

In the electronic device 101 according to various embodiments of the disclosure, the processor 120 may be configured to control the first image sensor 200 to divide and synthesize the image data having a larger size between the first image data and the second image data.

In the electronic device 101 according to various embodiments of the disclosure, the processor 120 may be configured to control the first image sensor 200 to generate and output the output image data by selecting one of the first image data or the second image data.

In the electronic device 101 according to various embodiments of the disclosure, the processor 120 may be configured to control the first image sensor 200 to generate and output the output image data by selecting the first image data and the second image data in accordance with a time based on the synchronizing signal.

The electronic device 101 according to various embodiments of the disclosure may further include a third image sensor 630. In the electronic device 101 according to various embodiments of the disclosure, the processor 120 may be configured to generate the first image data using the first image sensor 200 or 610, generate the second image data using the second image sensor 300 or 620, and generate third image data using the third image sensor 630, based on the synchronizing signal, transmit the third image data generated by the third image sensor 630 to the second image sensor, control the second image sensor 300 or 620 to generate first output image data by processing the second image data and the third image data based on the synchronizing signal, transmit the first output image data generated by the second image sensor 300 or 620 to the first image sensor 200 or 610, and control the first image sensor 200 or 610 to generate and output second output image data by processing the first image data and the first output image data based on the synchronizing signal.

A first image sensor 200 according to various embodiments of the disclosure may include a first active pixel sensor 201, an input port 212, an output port 210, a memory 213, a synthesis module 215a, a multiplexer 215b, and a controller 217. In the first image sensor 200 according to various embodiments of the disclosure, the controller 217 may be configured to control to generate first image data using a signal sensed through the first active pixel sensor 201 and store the generated first image data in the memory 213, receive second image data from an external image sensor through the input port 212 and store the received second image data in the memory 213, and control the synthesis module 215a or the multiplexer 215b to generate and output output image data by processing the first image data and the second image data based on a received synchronizing signal.

In the first image sensor 200 according to various embodiments of the disclosure, the controller 217 may be configured to control to generate and output the output image data by performing cross-synthesis of the first image data and the second image data in the unit of a frame based on the synchronizing signal.

In the first image sensor 200 according to various embodiments of the disclosure, the controller 217 may be configured to control to generate and output the output image data by performing cross-synthesis of the first image data and the second image data in the unit of a pixel based on the synchronizing signal.

In the first image sensor 200 according to various embodiments of the disclosure, the controller 217 may be configured to control to generate and output the output image data by performing cross-synthesis of the first image data and the second image data in the unit of a frame based on the synchronizing signal if the number of pixels of the first image data and the number of pixels of the second image data are different from each other.

In the first image sensor 200 according to various embodiments of the disclosure, the controller 217 may be configured to control to generate and output the output image data by adding padding data to the image data having a smaller size between the first image data and the second image data and synthesizing the image data added with the padding data.

In the first image sensor 200 according to various embodiments of the disclosure, the controller 217 may be configured to control to generate and output the output image data by dividing and synthesizing the image data having a larger size between the first image data and the second image data.

In the first image sensor 200 according to various embodiments of the disclosure, the controller 217 may be configured to control to discriminate common data and difference data from each other by comparatively analyzing the first image data and the second image data through the synthesis module 215a, and generate and output the output image data by synthesizing the common data of the first image data and the second image data.

In the first image sensor 200 according to various embodiments of the disclosure, the controller 217 may be configured to control to discriminate the common data and the difference data of the first image data and the second image data from each other based on at least one of data similarity, color, or contrast.

In the first image sensor 200 according to various embodiments of the disclosure, the controller 217 may be configured to control to generate and output the output image data by selecting one of the first image data or the second image data through the multiplexer 215b.

In the first image sensor 200 according to various embodiments of the disclosure, the controller 217 may be configured to control to generate and output the output image data by selecting the first image data and the second image data in accordance with a time based on the synchronizing signal.

In the first image sensor 200 according to various embodiments of the disclosure, the synchronizing signal is transmitted from a processor 120 of an electronic device 101 or the external image sensor.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a first image sensor;
a second image sensor electrically connected to the first image sensor; and
a processor operatively connected to the first image sensor and the second image sensor,
wherein the processor is configured to:
generate first image data using the first image sensor,
generate second image data using the second image sensor based on a synchronizing signal,
transmit the second image data to the first image sensor, and
control the first image sensor to generate output image data and output the output image data by processing the first image data and the second image data based on the synchronizing signal, and
wherein the first image sensor is configured to:

discriminate common data from difference data by comparatively analyzing the first image data and the second image data, and
generate and output the output image data by synthesizing the common data both of the first image data and the second image data.

2. The electronic device of claim 1, wherein the processor is further configured to:
transmit the synchronizing signal to the first image sensor and the second image sensor, and
control the first image sensor and the second image sensor to simultaneously generate the first image data and the second image data based on the synchronizing signal.

3. The electronic device of claim 1, wherein the processor is further configured to control the first image sensor to generate and output the output image data by performing cross-synthesis of the first image data and the second image data in a unit of a frame based on the synchronizing signal.

4. The electronic device of claim 1, wherein the processor is further configured to control the first image sensor to generate and output the output image data by performing cross-synthesis of the first image data and the second image data in a unit of a pixel based on the synchronizing signal.

5. The electronic device of claim 1, wherein the processor is further configured to control the first image sensor to generate and output the output image data by performing cross-synthesis of the first image data and the second image data in a unit of a frame based on the synchronizing signal if the number of pixels of the first image data and the number of pixels of the second image data are different from each other.

6. The electronic device of claim 5, wherein the processor is further configured to control the first image sensor to add padding data to one of the first image data or the second image data having a smaller size than the other and to synthesize the smaller sized image data with the padding data.

7. The electronic device of claim 6, wherein the processor is further configured to control the first image sensor to divide and synthesize one of the first image data or the second image data having a larger size than the other.

8. The electronic device of claim 1, wherein the processor is further configured to control the first image sensor to generate and output the output image data by selecting one of the first image data or the second image data.

9. The electronic device of claim 8, wherein the processor is further configured to control the first image sensor to generate and output the output image data by selecting the first image data and the second image data in accordance with a time based on the synchronizing signal.

10. The electronic device of claim 1, further comprising a third image sensor,
wherein the processor is further configured to:
generate the first image data using the first image sensor,
generate the second image data using the second image sensor,
generate third image data using the third image sensor, based on the synchronizing signal,
transmit the third image data to the second image sensor,
control the second image sensor to generate first output image data by processing the second image data and the third image data based on the synchronizing signal,
transmit the first output image data to the first image sensor, and
control the first image sensor to generate second output image data and output the second output image data by processing the first image data and the first output image data based on the synchronizing signal.

11. An image sensor comprising:
a pixel sensor;
an input port;
an output port;
a memory;
a synthesis module;
a multiplexer; and
a controller configured to:
generate first image data using a signal sensed through the pixel sensor,
store the first image data in the memory,
receive second image data from an external image sensor through the input port,
store the second image data in the memory,
control one of the synthesis module or the multiplexer to generate output image data and output the output image data by processing the first image data and the second image data based on a received synchronizing signal,
discriminate common data from difference data by comparatively analyzing the first image data and the second image data through the synthesis module, and
generate and output the output image data by synthesizing the common data both of the first image data and the second image data.

12. The image sensor of claim 11, wherein the controller is further configured to control to generate and output the output image data by performing cross-synthesis of the first image data and the second image data in a unit of a frame based on the synchronizing signal.

13. The image sensor of claim 11, wherein the controller is further configured to control to generate and output the output image data by performing cross-synthesis of the first image data and the second image data in a unit of a pixel based on the synchronizing signal.

14. The image sensor of claim 11, wherein the controller is further configured to control to generate and output the output image data by performing cross-synthesis of the first image data and the second image data in a unit of a frame based on the synchronizing signal if the number of pixels of the first image data and the number of pixels of the second image data are different from each other.

15. The image sensor of claim 14, wherein the controller is further configured to control to generate and output the output image data by adding padding data to one of the first image data or the second image data having a smaller size than the other and synthesizing the smaller sized image data with the padding data.

16. The image sensor of claim 14, wherein the controller is further configured to control to generate and output the output image data by dividing and synthesizing one of the first image data or the second image data having a larger size than the other.

17. The image sensor of claim 11, wherein the controller is further configured to control to discriminate the common data from the difference data of the first image data and the second image data based on at least one of data similarity, color, or contrast.

18. The image sensor of claim 11, wherein the controller is further configured to control to generate and output the output image data by selecting one of the first image data or the second image data through the multiplexer.

19. The image sensor of claim 18, wherein the controller is further configured to control to generate and output the output image data by selecting the first image data and the second image data in accordance with a time based on the synchronizing signal.

20. The image sensor of claim 11, wherein the synchronizing signal is transmitted from a processor of an electronic device or the external image sensor.

* * * * *